United States Patent

Wieber et al.

[11] Patent Number: 5,684,624
[45] Date of Patent: Nov. 4, 1997

[54] LENS CHANGE-OVER DEVICE WITH CENTERABLE RECEPTION RINGS

[75] Inventors: Karl Wieber, Asslar; Karl-Josef Schalz, Weilburg, both of Germany

[73] Assignee: Leica Mikroskopie und Systeme GmbH, Wetzlar, Germany

[21] Appl. No.: 397,247

[22] PCT Filed: Mar. 31, 1994

[86] PCT No.: PCT/DE93/00798

§ 371 Date: Mar. 20, 1995

§ 102(e) Date: Mar. 20, 1995

[87] PCT Pub. No.: WO94/07173

PCT Pub. Date: Mar. 31, 1994

[30] Foreign Application Priority Data

Sep. 19, 1992 [DE] Germany .......................... 42 31 407.0

[51] Int. Cl.⁶ .............................. G02B 7/02; G02B 21/00
[52] U.S. Cl. .......................... 359/384; 359/384; 359/821
[58] Field of Search .................... 359/368, 381–384, 359/391–398, 821

[56] References Cited

U.S. PATENT DOCUMENTS

| | | | |
|---|---|---|---|
| 3,930,712 | 1/1976 | Boughton et al. | 359/381 |
| 4,018,505 | 4/1977 | Peck | 359/381 |
| 4,025,171 | 5/1977 | Peck | 359/384 |
| 4,961,636 | 10/1990 | Gaul et al. | 359/381 |
| 5,508,850 | 4/1996 | Noguchi | 359/368 |

FOREIGN PATENT DOCUMENTS

| | | | |
|---|---|---|---|
| 1 547 374 | 12/1969 | Germany . | |
| 31 10 726 | 2/1982 | Germany . | |
| 242104 | 1/1987 | Germany | 359/821 |
| 242108 | 1/1987 | Germany | 359/821 |
| 81/00917 | 4/1981 | WIPO . | |

*Primary Examiner*—Thong Nguyen
*Attorney, Agent, or Firm*—Foley & Lardner

[57] ABSTRACT

A change-over device has a plurality of centerable reception rings (10), inserted into a sliding bearing (9), for optical components. A spring element having a plurality of tongues (16) split in the longitudinal direction is provided in such a way that in each case successive halves of adjacent tongues (16) rest against the rim of a reception ring (10) under spring pressure.

5 Claims, 2 Drawing Sheets

LENS CHANGE-OVER DEVICE WITH CENTERABLE RECEPTION RINGS

BACKGROUND OF THE INVENTION

The invention relates to a change-over device having a plurality of centerable reception rings, inserted into a sliding bearing, for optical components.

Change-over devices of this type are, for example, revolving turrets on microscopes. In this regard, it is necessary for polarization microscopy that the lenses inserted into a rotatable spherical cap on the turret be centered with respect to the optical axis of the microscope imaging system. The reception rings on the screwing-in part of the lenses are inserted for this purpose into a sliding bearing in the spherical cap and can be displaced in a defined fashion in this sliding bearing at right angles to the optical axis by setting screws. The receptacles are protected against torsion in the sliding bearing. The spherical cap is constructed from two shells. The reception rings are held in the axial direction in the sliding bearing between these two shells of the spherical cap by means of an annular corrugated spring. The production and assembly of the two-shell spherical cap design are very expensive. The overall height of the turret is relatively large and the number of centerable reception rings is limited.

The maximum height of the revolving turret is fixed by standardization measures. It is, however, advantageous if the height can be reduced, since then the exit apertures of the lenses can be brought closer to the downstream imaging optics. The diameters of the imaging beams are then smaller, with the result that further imaging optics can be configured more cost effectively.

The axis of rotation of the spherical cap of the revolving turret is inclined with respect to the optical axis of the microscope. A large angle of inclination has the advantage that the individual lenses swivel very quickly out of the working area when the spherical cap is rotated. Taking account of the prescribed maximum height of the revolving turret, a large angle of inclination reduces the permissible diameter of the spherical cap. It is therefore possible to arrange only a small number of lenses on the spherical cap.

Increasing the diameter of the spherical cap can be achieved under the abovenamed conditions only if the depth of the spherical cap is reduced and, furthermore, the permissible maximum height of the revolving turret is exploited. However, a flatter spherical cap has the disadvantage that in the interior of the turret little space is available between the fixed and the rotating parts, with the result that the arrangement of the centerable reception rings is rendered substantially more difficult.

SUMMARY OF THE INVENTION

It is therefore an object of the invention to reduce the overall height of the revolving turret, to increase the number of centerable reception rings and to simplify the design substantially.

The invention is a change-over device for a microscope. The change-over device includes a spherical cap having friction bearings and reception rings inserted into the spherical cap against the friction bearings. The change-over device also includes an assembly, connected to the spherical cap, to center each of the reception rings and a spring element, connected to the spherical cap. The spring element holds the reception rings in the spherical cap. The spring element has tongues, each tongue being split into two halves to form a pair of lugs, each pair of lugs applying spring pressure to edges of adjacent reception rings.

BRIEF DESCRIPTION OF THE DRAWINGS

The invention is represented diagrammatically in the drawings and is described in more detail below with the aid of an exemplary embodiment.

DETAILED DESCRIPTION OF EXEMPLARY EMBODIMENT OF THE INVENTION

Figure 1:
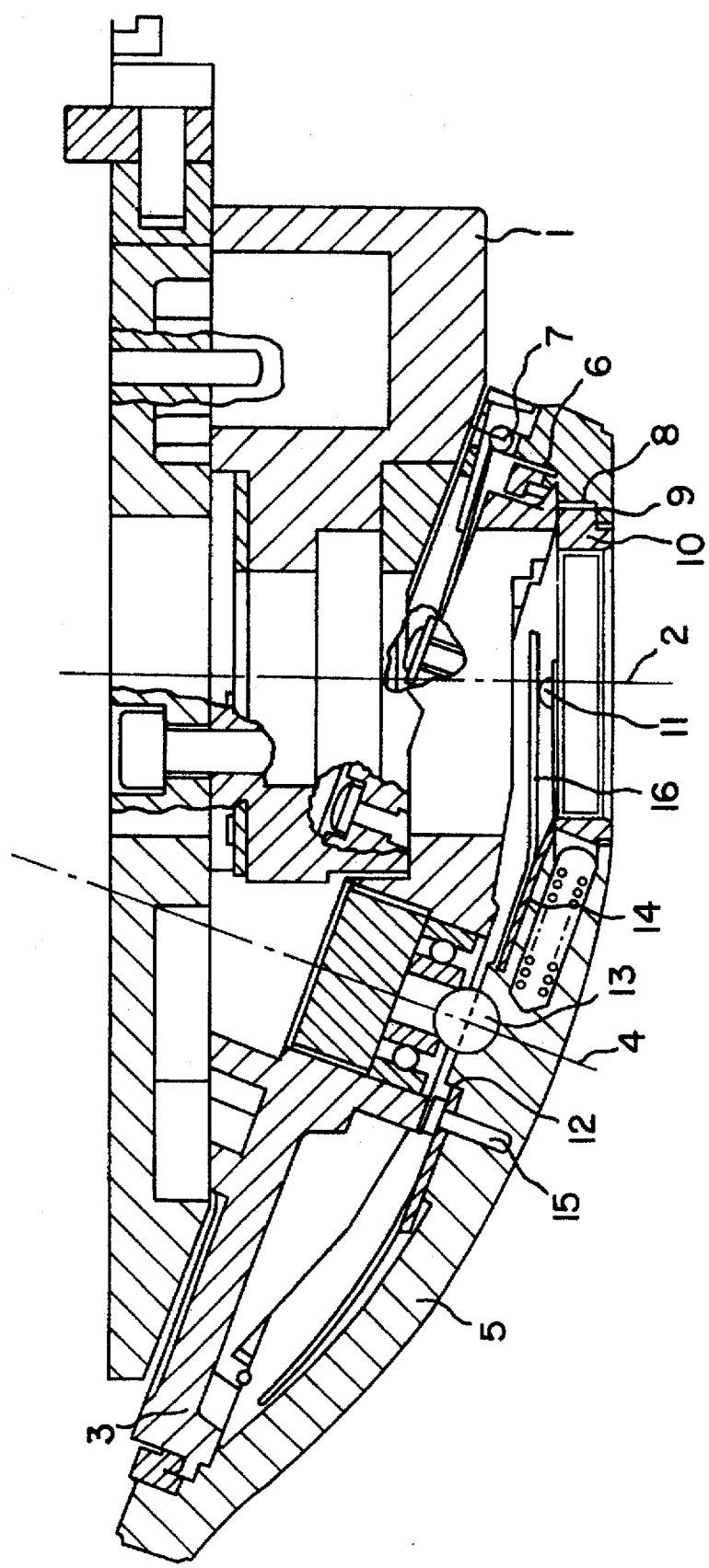
FIG. 1 shows a section through a revolving turret.

FIG. 1 shows a revolving turret 1, which can be exchangeably inserted into the stand of a microscope (not represented), in such a way that its vertical axis 2 coincides with the optical axis of the downstream microscope imaging system. An obliquely positioned surface 3 with an axis 4 of rotation is integrally formed on the revolving turret 1. Mounted on this surface 3 is a spherical cap 5 which can be rotated about the axis 4 of rotation in an annular ballbearing 6. The spherical cap 5 can be brought into a plurality of defined working positions via latching means 7.

Stepped circular apertures 8 are provided in the spherical cap 5. The step is formed by a sliding bearing 9. Reception rings 10 which have a smaller outside diameter than the apertures 8 are inserted, resting against this sliding bearing 9, into the spherical cap 5. The reception rings 10 can therefore be displaced at right angles to the axis 2 in the sliding bearing 9. Two balls 11 are inserted into the upper rim of the reception ring 10.

The spherical cap 5 further has a central member 12 with a centering ball 13 on the axis 4 of rotation. A spring element is mounted with its central part 14 on the member 12 end permanently connected to the spherical cap 5 via screws 15. The spring element has tongues 16 which rest on the balls 11 under spring pressure and hold the reception rings 10 securely in the sliding bearing 9, the trensverse displaceability not being impeded.

Figure 2:
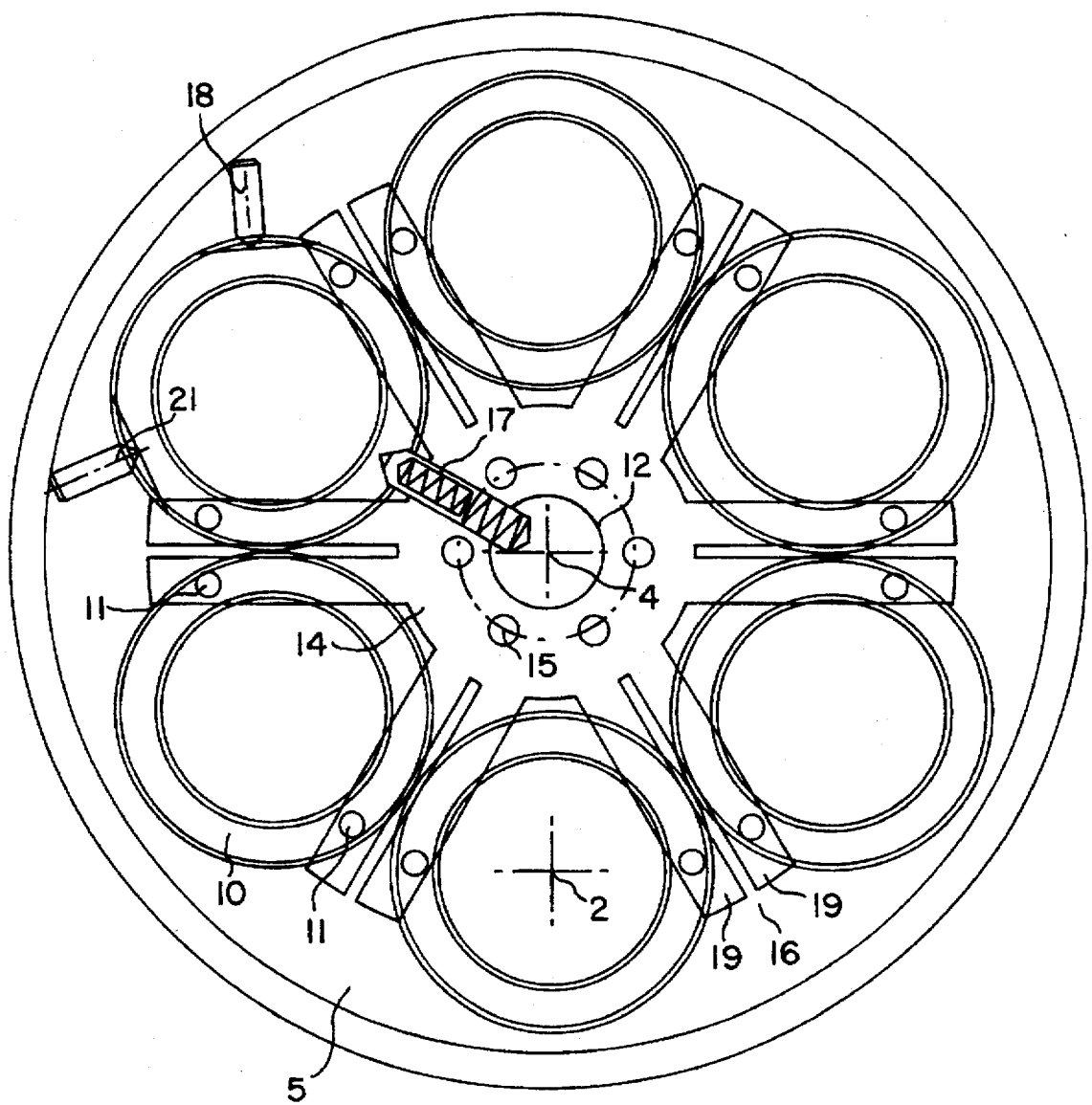
FIG. 2 shows a top view of the spherical cap with a star-shaped spring element.

FIG. 2 shows a top view of the reception rings 10 inserted into the spherical cap 5 and having the balls 11 inserted into the upper rim. The reception rings 10 can be adjusted in a defined fashion in the sliding bearing 9 via a spring pin 17 and setting screws 18, 21, and are simulteneously protected against torsion when lenses (not represented) are inserted into the reception rings 10. In FIG. 2, the adjusting means are represented as an example only on one reception ring 10.

The central part 14 of the spring element is permanently connected to the spherical cap 5 in a fashion symmetrical with respect to the axis 4 of rotation via screws 15. Emanating from this central part 14 are starshaped tongues 16 which are bifurcated, or split, in the longitudinal direction and in this way respectively form independent spring lugs 19. Successive lugs 19 of adjacent tongues 16 press against the balls 11. The free diameter of the reception rings 10 is not limited by the spring lugs 19. It is to be borne in mind that because of the mounting parts of the lenses, the surface area required for the passage of the beams is smaller in any case then the ring diameter.

The spherical cap 5 can be configured very flat due to the use of the star-shaped spring element 14, 16, 19. There is no need for an additional counterbearing to hold the reception rings 10. The spherical cap 5 is thus a substantially simpler component to produce. The flat overall height of the spherical cap 5 provides more freedom to increase the distance in the direction of the axis 4 of rotation, without exceeding the permissible overall height of the revolving turret. Small changes in the angle of inclination of the axis 4 of rotation already have a greater influence on the permissible diameter of the spherical cap 5. As a result, the diameter of the spherical cap 5 can be increased, and more reception rings 10 can be arranged on it. Six reception rings 10 are represented in the exemplary embodiment. Known arrangements generally have only four reception rings. The angle of inclination of the axis 4 of rotation can still be chosen to be relatively large, so that rapid swivelling out of the lenses is guaranteed.

Instead of the spring element being of star-shaped construction, it can also be of linear configuration, so that this way of holding reception rings can also be used advantageously in the case of a changeover carriage of limited overall height which has centerably inserted birefringent prisms, polarization filters, mark carriers etc.

We claim:

1. A change-over device for a microscope, comprising:
    a spherical cap having a plurality of friction bearings;
    a plurality of reception rings each inserted into the spherical cap against a corresponding one of said plurality of friction bearings;
    an assembly, connected to said spherical cap, to center each of the plurality of reception rings; and
    a spring element, connected to said spherical cap, to hold the plurality of reception rings in the spherical cap, the spring element having tongues, each tongue being split into two halves to form a pair of lugs, each pair of lugs applying spring pressure to edges of adjacent reception rings.

2. A device as set forth in claim 1, wherein the number of reception rings is at least six.

3. A device as set forth in claim 1, wherein said assembly comprises a spring pin and at least one setting screw.

4. A device as set forth in claim 1, further comprising balls inserted in the reception rings against which said lugs rest.

5. A device as set forth in claim 1, wherein said spring element is star-shaped and is mounted with its center on an axis of rotation of the spherical cap.

* * * * *

UNITED STATES PATENT AND TRADEMARK OFFICE
CERTIFICATE OF CORRECTION

PATENT NO. : 5,684,624
DATED : November 4, 1997
INVENTOR(S) : Karl WIEBER et al.

It is certified that error appears in the above-indentified patent and that said Letters Patent is hereby corrected as shown below:

On the cover page, column 1, item "[22] PCT Filed: Mar. 31, 1994" to --[22] PCT Filed: Sept. 3, 1993--.

Signed and Sealed this

Twenty-fourth Day of February, 1998

Attest:

BRUCE LEHMAN

*Attesting Officer*   *Commissioner of Patents and Trademarks*